3,119,692
PREPARATION OF POULTRY GROWTH PROMOTING SUBSTANCES

James R. Couch and Harry D. Stelzner, both of Poultry Science Dept., Texas A. & M. College, College Station, Texas
No Drawing. Filed Sept. 14, 1960, Ser. No. 55,868
11 Claims. (Cl. 99—4)

This invention relates to poultry growth promoting substances and methods of preparing these products. More particularly, it is concerned with the isolation of compositions useful as growth promoting agents for poultry, and processes for the preparation of these compositions from materials having poultry growth promoting activity.

It has been known for some time that various materials such as dried distillers' solubles, fish solubles, whey, and the like contain small amounts of material which produce marked growth responses in poultry. It has been found that, in part, this growth stimulation is due to the minerals molybdenum, potassium and zinc present in these crude materials. However, further experiments have indicated the presence of other unidentified factors which are at least, in part, responsible for the growth promoting activity of these materials. It is also known that these various sources of poultry growth promoting substances contain certain materials which depress rather than promote the growth of poultry. It is therefore desirable to separate the growth promoting substances and at the same time eliminate the materials responsible for the growth depressing effect.

It is an object of the present invention to provide methods for the separation of new compositions having enhanced growth promoting activity. Another object is to provide new compositions which, when present in the diet of poultry in small amounts, results in increased growth. A further object is to provide two concentrates, herein called S-193 and S-300, which are useful poultry growth promoting compositions. Still another object is to provide methods for the preparation of S-193 and S-300. Other objects will be apparent from the detailed description of this invention hereinafter provided.

In accordance with one embodiment of the present invention, it is now found that concentrates containing enhanced amounts of a factor or factors useful as poultry growth promoting agents can be recovered from suitable raw materials containing such factors by a series of extraction procedures. Thus, by the present invention suitable sources of these previously unidentified growth factors such as dried distillers' solubles, condensed fish solubles, corn meal, brewers' yeast, soybean meal, whey and fermentation solids are subjected to procedures which result in the recovery of concentrates containing substantial amounts of material having growth promoting activity for poultry. For example, we have found that by subjecting such materials to a series of extractions it is possible to prepare concentrates which are considerably more potent as poultry growth promoting agents than preparations heretofore available.

Pursuant to an embodiment of our invention, such concentrates of the poultry growth promoting factors are obtained by a series of extraction procedures. For example, in accordance with our process, a source of material containing the growth promoting substance is extracted with aqueous ethanol, the ethanol soluble extracts are subjected to further extraction with acetone, and a factor or factors having poultry growth promoting activity is recovered from the resulting acetone extracts.

In carrying out the procedures of our invention, it is preferred to first subject the source of the poultry growth promoting substances to autoclaving since this step results in the obtainment of maximum amounts of the desired growth promoting materials under optimum conditions. Further, we usually prefer to acidify the raw material by the addition of an inorganic acid prior to autoclaving. Alternatively, the material can be autoclaved on the alkaline side by the addition of sufficient inorganic alkali, such as sodium hydroxide, to render the material alkaline. The source of the poultry growth promoting substances either before or after autoclaving is first subjected to extraction with 50–80% alcohol, the resulting alcohol extract is separated and concentrated, the concentrated alcohol soluble portion is intimately contacted with acetone, and the resulting acetone extracts are concentrated to produce a material having greatly enhanced growth promoting activity for poultry.

In accordance with a further embodiment of this invention, the acetone soluble extracts prepared as described above can be further subjected to other extraction procedures to further eliminate impurities and to obtain an even more concentrated composition of poultry growth promoting factors. Thus, by extracting the acetone soluble material with a non-polar solvent such as diethyl ether, petroleum solvents, and the like, additional impurities are removed. The material, insoluble in the non-polar solvents, is then subjected to further extraction with acetone whereby further purification is effected. The acetone soluble material can then be subjected to another extraction to eliminate other impurities and obtain a concentrate containing an even higher concentration of poultry growth promoting substances.

Pursuant to one method of effecting these further purifications, the acetone extract of the material insoluble in the non-polar solvents is adjusted to a pH of about 9 to 10 with ammonium hydroxide. The acetone extract is then separated and concentrated to a small volume. This residue is then dissolved in a mixture of isopropanol and chloroform; mixtures ranging from about 50:50 to about 85:15 of isopropanol-chloroform by volume being suitable for this purpose. Upon cooling the resulting solution, a crystalline material precipitates and is separated from the solution. This crystalline material having a melting point of about 191–193° C., herein called S-193, is a concentrate effective in small amounts as a growth promoting agent for poultry.

Alternatively, another concentration of the poultry growth promoting substances is obtained when the extraction of the material insoluble in the non-polar solvents is effected with acetone without adjusting the pH of the mixture. In this embodiment of our invention, the residue insoluble in the non-polar solvent is intimately contacted with acetone, the resulting acetone layer separated, and finally concentrated to a small volume. This residue is adjusted to a pH of about 7 and dissolved in a mixture of isopropanol and chlorofrom. After cooling, the resulting precipitate is removed and slurried with a small amount of water. The resulting suspension is filtered and the filtrate evaporated to dryness. This residue is then suspended in acetone, filtered, and the filtrate evaporated to dryness. The dried residue is dissolved in isopropanol-chlorform and the resulting solution cooled. Upon standing in the cold, a fine crystalline material which turns brown at 290° C. and chars at about 300° C. precipitates and is separated from the solution. This material, herein called S–300, is effective in small amounts as a growth promoting agent for poultry.

The examples which follow illustrate detailed procedures for the preparation of the various compositions referred to above.

EXAMPLE 1

Preparation of S–300

To fifty pounds of dried distillers solubles (a composite sample prepared by the Distillers Feed Research Council of distillers solubles from various companies) was added 16 liters of 6 N sulfuric acid, and the mixture stirred to moisten all of the material. The mixture was then autoclaved for 30 minutes at 15 lbs./sq. in. pressure at 121° C. in a conventional steam-sterilizer autoclave. After cooling, a saturated solution of sodium hydroxide in water was slowly added to bring the mass to a pH of 7; about a gallon of alcohol also being added to facilitate the mixing.

Eighty liters of 95% ethyl alcohol was then added to the mixture and vigorously stirred with a propellor type mixer for about 6–8 hours. The resulting mixture was then filtered and the residue re-extracted with about 50 liters of 80% ethyl alcohol. The mixture was then filtered and the alcoholic filtrates combined and evaporated under vacuum at a temperature of about 75–80° C. The evaporation was continued until the volume of the residue was about 5 liters. This residue, in the form of a thick dark brown tar, was then extracted with about 20 liters of acetone. The acetone was thoroughly mixed with the residue and the resulting suspension was allowed to stand for about 18 hours. The supernatant aqueous acetone solution was separated from the residue and then filtered. The residue was then thoroughly mixed with 20 liters of 80% acetone-water and again allowed to stand for about 18 hours. The supernatant acetone layer was syphoned off, filtered and combined with the first acetone extracts. The residue was again resuspended with 20 liters of 80% acetone-water and the resulting suspension allowed to stand for about 18 hours. The acetone layer was separated and combined with the previous acetone extracts for concentration. The combined acetone extracts were evaporated under diminished pressure at a maximum temperature of about 80° C. to a concentrate of about one liter.

The resulting concentrate was then transferred to a second vessel; a small amount of ethyl ether being used to wash out the first vessel. The residue remaining in the first vessel was mixed with 100–200 ml. of acetone and the resulting acetone layer separated. This extraction with acetone was repeated twice more giving a total of about 500 ml. of acetone extracts. The extracted gummy mass is then discarded.

To the main portion of the one liter concentrate in the second vessel was then added about 8 liters of ethyl ether and the mixture stirred for sufficient time to insure thorough mixing of the material. After settling for about 12 hours, the ether solution was separated from the residue.

The ether solution was then washed with 500 ml. of distilled water and the recovered aqueous phase was concentrated under vacuum at a maximum temperature of 70° C. The washed ether solution was discarded.

The concentrated aqueous extract was washed twice with 100–200 ml. of acetone and the resulting acetone extract and the acetone extract from the residue in the first vessel were combined with the residue obtained from the ethyl ether extraction. Sufficient acetone was then added to make a total of 8 liters of acetone. The acetone suspension was stirred and the resulting mixed suspension placed in the cold room and allowed to stand for about 18 hours.

The acetone layer was separated from the gummy residue and the gummy residue washed twice with one half liter portions of acetone which were added to the main acetone extracts. The acetone insoluble residue was discarded.

The acetone extracts were then combined and evaporated in vacuum at a temperature of 70° C. to obtain about 50–75 ml. of gummy residue. To this gum was added 500 ml. of isopropanol:chloroform (75:25 v./v.) and the mixture was shaken to dissolve the gum. The resulting solution was then placed in a cold chest for about 48 hours. During this period a precipitate formed and was recovered by centrifugation in a refrigerated centrifuge at 2500 r.p.m. for 45 minutes at a temperature of −20° C. The precipitate consisting of about 800 mg. of material was suspended in 50 ml. of water and the resulting suspension filtered to remove insoluble material. The water solution containing the active component was evaporated in a rotary flask evaporator to dryness. To this dry residue was then added 100 ml. of acetone. After thorough mixing, the acetone suspension was filtered and evaporated to dryness. To the dry residue was then added 100 ml. of isopropanol:chloroform (75:25) and the resulting solution was again placed in the cold chest for 48 hours. The solution at this point contained a white precipitate which was recovered by centrifugation in a refrigerated centrifuge.

The dried precipitate so obtained was recrystallized from a small amount of water to obtain needles of the microcrystalline class which were found to turn brown at about 290° C. and to char at about 300° C. This product is called S–300.

EXAMPLE 2

When the process of Example 1 was repeated using dried brewers' yeast, condensed fish solubles or dried antibiotic fermentation residue in place of the dried distillers' solubles, a similar product having enhanced poultry growth promoting activity was obtained.

EXAMPLE 3

Preparation of S–193

In this experiment the procedure of Example 1 was repeated to the point where the residue obtained from the extraction with ethyl ether was combined with the two acetone extracts (column 2, lines 72 to 75). To this mixture of the residue and the acetone extracts was added sufficient concentrated ammonium hydroxide solution to pH 9–10. Now additional acetone was added until the total volume of the solution was 4 liters. This mixture was stirred with a wooden paddle by hand for 5–10 minute periods alternating with 30-minute standing periods over the next three hours, i.e., 6 or 7 spaced stirring periods of 5–10 minutes each. The thoroughly mixed suspension was placed in the cold room and allowed to stand 18 hours overnight.

The actone layer was syphoned away from the gummy residue. The gummy residue was extracted twice more with 500 ml. of acetone.

The first acetone extract and the two washes were combined and evaporated under vacuum at a temperature of 70° C. to reduce the volume to 2 liters. The 2 liters were transferred to the rotary evaporator and reduced in volume until no more solvent or water was distilled off with the heating bath at 70° C. Again 50–75 cc. of gummy material remains in the flask after this evaporation. To this gum was added 500 cc. of isopropanol:chloroform (75:25 v./v.) and the mixture shaken to dissolve all of this gum. The solution was then placed in a deep-freeze chest for 48 hours. During this period a precipitate formed and was removed by centrifugation in a refrigerated centrifuge at −20° C. The supernatant liquid was decanted. The precipitate in the bottom of the bottles is the factor concentrate.

About 225 mg. were obtained in this manner. This precipitate was dissolved in 50 ml. of distilled water and the suspension filtered. The precipitate was discarded. The filtrate was evaporated essentially to dryness in a rotating flask evaporator. The dried material in the flask was then dissolved in isopropanol:$CHCl_3$ (75:25 v./v.). About 100 ml. of the solvent is used. This material only partially dissolves but the residue was not removed. The suspension was placed in the deep-freeze chest again for 48 hours. After standing, long needle shaped crystals can be seen without microscopes. These suspended crystals were removed by filtering the suspension through filter paper. About 16 mg. of crystals were recovered in this way.

The melting point of these crystals is 191–193° C. This is the product herein called S–193.

EXAMPLE 4

When the procedures of Example 3 were repeated with concentrates obtained using dried whey, condensed fish solubles, dried brewers' yeast and dried fermentation solubles as the starting material in place of the dried distillers' solubles, a similar characteristic concentrate, herein called S–193, was obtained.

EXAMPLE 5

*Preparation of S–193*

To 5 kg. of condensed fish solubles was added one liter of 6 N sulfuric acid with thorough mixing. The resulting acidified condensed fish solubles was autoclaved for 30 minutes at 15 lbs. pressure at 121° C. After cooling the mixture was neutralized by the slow addition of 100 ml. of saturated sodium hydroxide to a pH of 7. Twenty liters of 95% ethanol were then added to the neutralized fish solubles and the resulting suspension stirred for about 4 hours. After standing for about 12 hours, the mixture was filtered.

The resulting filtrate was evaporated under vacuum with a maximum temperature of about 80° C. to about 2 liters. To this residue was then added 8 liters of acetone and the mixture allowed to stand for 12 hours and then filtered. The recovered filtrate was evaporated to about 1200 cc. in vacuum. To this concentrate was added 4 liters of ethyl ether and the ethyl ether phase was removed by decantation. The ether insoluble residue consisting of about one liter was treated with 4 liters of acetone and the pH of the suspension adjusted to 9 by the addition of concentrated ammonium hydroxide. The acetone soluble portion of the mixture was separated by decantation and filtered. The resulting filtrate was evaporated to about 200 cc. under vacuum with a maximum temperature of about 80° C. To this concentrate thus obtained was added 800 cc. of isopropanol:chloroform (75:25 v./v.) and the resulting solution placed in the cold room for about 48 hours. At this point a crystalline product had separated and was recovered by filtration. The product so obtained weighed about 9.6 mg. and consisted of a white crystalline material melting at 191–193° C.

EXAMPLE 6

Alternatively, S–193 can also be obtained following the procedures described in Example 1 for the preparation of S–300 by adjusting the pH of the final isopropanol-chloroform filtrate after the recovery of the S–300 crystals to about 9 to 10. When this alkaline solution was allowed to stand at room temperature for about five weeks, it was noted that some crystalline material had precipitated. This material was removed by filtration after two months standing and was found to be S–193 material.

The activity of the various compositions or concentrates obtained as described in the foregoing experiments as poultry growth promoting agents was determined in a series of experiments in chicks and poults.

Tests with turkey poults demonstrated the activity of the composition S–300 obtained in accordance with the procedures described in Example 1. In these tests day-old Broad Breasted Bronze poults obtained from a commercial source were used. The dams had received a practical breeder diet presumed to be adequate in all known required nutrients. The poults were individually wing-banded and were distributed at random in groups of 11 in electrically heated battery breeders. The individual groups were then maintained on the experimental diets having the following composition.

| Ingredient: | Percent |
| --- | --- |
| Starch | 42.84 |
| Soybean protein | 40.00 |
| Soybean oil | 3.00 |
| Wood pulp | 3.00 |
| $CaCO_3$ | 1.63 |
| $CaHPO_4.2H_2O$ | 6.01 |
| NaCl | 0.50 |
| $MnSO_4.H_2O$ | 0.114 |
| $MgSO_4.7H_2O$ | 0.576 |
| $FeSO_4.7H_2O$ | 0.015 |
| KCl | 1.000 |
| $ZnCl_2$ | 0.0104 |
| $CuSO_4$ (anhyd.) | 0.0011 |
| KI | 0.0007 |
| $CoCl_2.6H_2O$ | 0.0001 |
| $Na_2MoO_4.2H_2O$ | 0.0001 |

The basal diet was supplemented with the following per kilogram: 10 mg. riboflavin, 20 mg. D-calcium pantothenate, 8 mg. pyridoxine HCl, 120 mg. niacin, 10 mg. thiamin HCl, 4 mg. folic acid, 20 mg. p-aminobenzoic acid, 1 gm. inositol, 0.2 mg. biotin, 10,000 I.U. vitamin A, 2,000 I.C.U. vitamin $D_3$, 7.0 gm. DL-methionine, 3.5 gm. glycine, 125 mg. butylated hydroxy toluene, 50 mg. chlortetracycline, 20 mg. α-tocopheryl acetate, 1.5 gm. choline chloride, 1.0 mg. menadione sodium bisulfite and 20 mcg. vitamin $B_{12}$.

The corn distillers' dried solubles were added to the diet as the expense of soybean protein and starch to maintain a constant protein level. The other fractions were merely added to the basal diet in an amount equivalent to that obtainable from 10% of the dried distillers' solubles. After 4 weeks the turkey poults were weighed.

The results shown in the following table summarize those obtained from 5 replicates, each containing 11 turkey poults.

TABLE 1

| Diet | 4 Wks. | Percent Response | Percent Mortality | F.E.[1] |
| --- | --- | --- | --- | --- |
| Basal | 602.2 | | 7.4 | 1.72 |
| Basal + 10% DDS [2] | 697.8 | 15.9 | | 1.42 |
| Basal + 0.21 mg./kg. of S–300[3] + 10% DDS | 753.9 | 25.2 | 5.4 | 1.33 |
| Basal + Ash of 10% DDS[4] | 627.8 | 4.3 | 5.4 | 1.65 |
| Basal + Ash of 10% DDS + 0.21 mg./kg. of S–300 | 729.9 | 21.2 | 1.8 | 1.34 |
| Basal + 0.21 mg./kg. of S–300[3] | 749.3 | 24.4 | 5.4 | 1.31 |
| Basal + Ash of S–300[4] | 618.3 | 2.7 | 3.6 | 1.60 |
| Basal + 1.05 mg./kg. of S–300[5] | 752.7 | 25.0 | 3.6 | 1.29 |

[1] Feed efficiency = $\dfrac{\text{amount of weight gain}}{\text{amount of feed}}$

[2] Dried distillers' solubles.
[3] 0.21 mg./kg. of S–300 is amount equivalent to 10% of dried distillers' solubles.
[4] Ash of dried distillers' solubles fed at 7.74 gm./kg. which is equivalent of 10% dried distillers' solubles.
[5] Equivalent to 50% dried distillers' solubles.

The foregoing tabulated data clearly shows the growth promoting activity of S–300 and the fact that this activity is not due to the mineral content of the dried distillers' solubles.

In additional experiments which were also carried out in the manner described above, S–300 compositions obtained from various sources and prepared as described in the foregoing examples were tested to determine their activity as growth promoting agents. The following table summarizes the results of these experiments in which 5 replicates of 12 poults per group were tested on the indicated diets.

TABLE 2

| Diet | 4 Wk. Avg. | Percent Response | Percent Mortality | F.E. |
|---|---|---|---|---|
| Basal | 562.2 | | 3.34 | 1.41 |
| Basal + 10% DDS[1] | 632.4 | 12.5 | 1.67 | 1.24 |
| Basal + S-300 from DDS[2] | 645.3 | 14.8 | | 1.24 |
| Basal + 10% Whey | 609.1 | 8.4 | 1.67 | 1.30 |
| Basal + S-300 from Whey[3] | 646.7 | 15.0 | | 1.24 |
| Basal + 10% DBY[4] | 622.1 | 10.7 | | 1.32 |
| Basal + S-300 from DBY[5] | 614.1 | 9.3 | 3.34 | 1.23 |
| Basal + 10% CFS[6] | 589.3 | 4.8 | 11.67 | 1.42 |
| Basal + S-300 from CFS[7] | 592.4 | 5.4 | 1.67 | 1.23 |
| Basal + 10% AFR[8] | 631.7 | 12.3 | 1.67 | 1.23 |
| Basal + S-300 from AFR[9] | 59.8 | 5.1 | 1.67 | 1.23 |

[1] Dried distillers' solubles.
[2] Added to diet at level of 0.29 mg./kg. of feed equivalent to 10% dried distillers' solubles.
[3] Added to diet at level of 0.29 mg./kg. of feed equivalent to 10% whey.
[4] Dried brewers' yeast.
[5] Added to diet at level of 0.14 mg./kg. of feed equivalent to 10% dried brewers' yeast.
[6] Condensed fish solubles.
[7] Added to diet at level of 0.19 mg./kg. of feed equivalent to 10% condensed fish solubles.
[8] Antibiotic fermentation residue.
[9] Added to diet at level of 0.35 mg./kg. of feed equivalent to 10% antibiotic fermentation residue.

These tests indicate the growth promoting activity of the various S-300 fractions from different sources of poultry growth promoting activity prepared in accordance with the described procedures of the examples.

In other turkey growth tests carried out in the same manner as the tests described above, the effect of supplementing the basal diet with varying amounts of S-300 obtained from dried distillers' solubles and with S-193 obtained from condensed fish solubles by the procedures described in the examples was determined. These tests were carried out with 12 turkey poults per group replicated 5 times. The table below summarizes the results of these experiments.

TABLE 3

| Diet | Average Weight 2 Weeks, Gms. | Average Weight 4 Weeks, Gms. | Percent Response (4 wks.) | Percent Mortality | F.E. (4 wks.) |
|---|---|---|---|---|---|
| Basal | 331 | 635.6 | | 5.00 | 1.46 |
| Basal+10% DDS | 324 | 681.4 | 7.2 | 3.33 | 1.29 |
| Basal+280 γ/kg. S-300 | 337 | 709.6 | 11.6 | 1.67 | 1.17 |
| Basal+10% DDS[1] | 368 | 663.0 | 4.3 | 3.33 | 1.30 |
| Basal+280 γ/kg. S-300[1] | 323 | 670.1 | 5.4 | 1.67 | 1.22 |
| Basal+70 γ/kg. S-300 | 331 | 697.6 | 9.7 | 3.33 | 1.21 |
| Basal+140 γ/kg. S-300 | 333 | 693.7 | 9.1 | 3.33 | 1.19 |
| Basal+210 γ/kg. S-300 | 317 | 693.2 | 9.7 | 1.67 | 1.23 |
| Basal+5% CFS | 346 | 672.1 | 15.7 | 8.33 | 1.22 |
| Basla+150 γ/kg. of S-193 CFS | 345 | 727.8 | 14.5 | 8.33 | 1.14 |
| Basal+150 γ/kg. of S-193 from CFS+280 γ/kg. of S-300 | 338 | 738.9 | 16.3 | 5.00 | 1.10 |

[1] Diet supplement with DDS and S-300 only during the last two weeks of the test.

The above tabulated results show that (1) the growth promoting effect of S-300 when the diet is supplemented with amounts as low as 70γ/kg. of feed, (2) the growth promoting effect of S-300 is greater when the turkey poults are fed the diet containing the factor for the entire 4 week period than when the factor is only added to the diet during the final two weeks of the test, and (3) the pronounced growth promoting effect obtained with the factor S-193 from condenesd fish solubles added to the basal diet.

Various changes and modifications of the invention can be made and, to the extent that such variations incorporate the spirit of this invention, they are intended to be included within the scope of the appended claims.

We claim:

1. The process for the preparation of poultry growth promoting active substances which comprises autoclaving a source of said active substance from the group consisting of dried distillers' solubles, condensed fish solubles, corn meal, brewers' yeast, soybean meal, fermentation solids and whey, neutralizing the resulting autoclaved material to a pH of about 7, extracting said neutralized material with ethanol, separating and evaporating the ethanol extracts, extracting the resulting residue with acetone and evaporating the resulting acetone extracts to recover material having enhanced poultry growth promoting activity.

2. The process for the preparation of poultry growth promoting active substances which comprises autoclaving an acidified source of said active substance from the group consisting of dried distillers' solubles, condensed fish solubles, corn meal, brewers' yeast, soybean meal, fermentation solids and whey, neutralizing the resulting autoclaved material to a pH of about 7, extracting the neutralized material with ethanol, separating and evaporating the ethanol extracts, extracting the resulting residue with acetone, evaporating the resulting acetone extracts, intimately contacting the resulting residue with a non-polar solvent, separating the non-polar solvent extracts, extracting the insoluble material with acetone and concentrating the resulting acetone extracts.

3. The process of claim 2 wherein the non-polar solvent is ethyl ether.

4. The process for the preparation of poultry growth promoting active substances which comprises autoclaving an acidified source of said active substances from the group consisting of dried distillers' solubles, condensed fish solubles, corn meal, brewers' yeast, soybean meal, fermentation solids and whey, neutralizing the autoclaved material to a pH of about 7, extracting the neutralized material with ethanol, separating and evaporating the ethanol extracts, extracting the resulting residue with acetone, evaporating the acetone extracts, intimately contacting the acetone residue with a non-polar solvent, separating the non-polar solvent layer, extracting the non-polar solvent insoluble material with acetone, adjusting the pH of the acetone mixture to about 9.0 with ammonium hydroxide, evaporating the acetone extracts, adding a mixture of isopropanol and chloroform to the resulting concentrated acetone extracts and recovering a precipitate melting at about 191–193° C. from the resulting extracts.

5. The process of claim 4 wherein the non-polar solvent is ethyl ether.

6. The process for the preparation of poultry growth promoting active substances which comprises autoclaving an acidified source of said active substances from the group consisting of dried distillers' solubles, condensed fish solubles, corn meal, brewers' yeast, soybean meal, fermentation solids and whey, neutralizing the autoclaved material to a pH of about 7, extracting the neutralized material with ethanol, separating and evaporating the ethanol extracts, extracting the resulting residue with acetone, evaporating the resulting acetone extracts, intimately contacting the acetone residue with a non-polar solvent, separating the non-polar solvent layer, extracting the non-polar solvent insoluble material with acetone, evaporating the acetone extracts, adding a mixture of isopropanol and chloroform to the resulting concentrated acetone extracts, recovering a precipitate melting at about 191–193° C. from the resulting cooled extracts, suspending the insoluble residue in water and removing insoluble material, evaporating the aqueous solution to dryness, suspending the residue in acetone and removing any insoluble materials, evaporating the acetone solution to dryness, dissolving the resulting residue in isopropanol-chloroform mixture and separating a crystalline material which turns brown at about 290° C. and chars at about 300° C. from the resulting cooled solution.

7. The process of claim 6 wherein the non-polar solvent is ethyl ether.

8. The process of claim 2 wherein the starting material is dried distillers solubles.

9. The process according to claim 4 wherein the starting material is whey.

10. The process according to claim 4 wherein the starting material is condensed fish solubles.

11. The process of claim 4 wherein the starting material is a fermentation residue, References Cited in the file of this patent

UNITED STATES PATENTS 2,931,726     Garner _____ Apr. 5, 1960